(12) United States Patent
Olson et al.

(10) Patent No.: US 8,152,997 B1
(45) Date of Patent: *Apr. 10, 2012

(54) STORMWATER CONTROL SYSTEM AND RELATED METHOD

(75) Inventors: Norman L. Olson, Port Orchard, WA (US); Wesley R. Johnson, Hansville, WA (US); Richard H. Langford, II, Port Orchard, WA (US)

(73) Assignee: N.L. Olson & Associates, Inc., Port Orchard, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/181,003

(22) Filed: Jul. 12, 2011

Related U.S. Application Data

(63) Continuation-in-part of application No. 12/550,480, filed on Aug. 31, 2009, now Pat. No. 7,988,851.

(51) Int. Cl.
*E02B 11/00* (2006.01)

(52) U.S. Cl. ............. 210/170.03; 210/170.07; 405/38; 405/43; 405/50

(58) Field of Classification Search .......... 210/163, 210/164, 170.01, 170.03, 170.07, 170.08; 405/36, 38, 43, 45, 50
See application file for complete search history.

(56) References Cited

U.S. PATENT DOCUMENTS

| | | | | |
|---|---|---|---|---|
| 4,199,272 A | * | 4/1980 | Lacey | 405/36 |
| 4,919,568 A | * | 4/1990 | Hurley | 405/43 |
| 5,183,355 A | * | 2/1993 | Treat et al. | 405/50 |
| 6,467,994 B1 | * | 10/2002 | Ankeny et al. | 210/170.03 |
| 6,517,284 B2 | * | 2/2003 | Gamache | 405/36 |
| 6,533,941 B2 | * | 3/2003 | Butler | 210/163 |
| 6,641,335 B1 | * | 11/2003 | Allard | 405/45 |
| 6,991,734 B1 | * | 1/2006 | Smith et al. | 210/170.03 |
| 7,105,086 B2 | * | 9/2006 | Saliba | 210/170.03 |
| 7,351,004 B2 | * | 4/2008 | Shaw et al. | 405/50 |
| 7,758,747 B2 | * | 7/2010 | Bryant | 210/163 |
| 7,758,749 B2 | * | 7/2010 | Cook et al. | 210/170.03 |

* cited by examiner

*Primary Examiner* — Christopher Upton
(74) *Attorney, Agent, or Firm* — Verrill Dana, LLP; Chris A. Caseiro

(57) ABSTRACT

A stormwater control system including conveyance, filtration and discharge systems. The conveyance system includes a set of conduits and connections providing a flow path through a compacted soil embankment from an upper inlet to a lower discharge area of an underlying soil infiltration zone. The control system has configurations for transferring stormwater from pervious and impervious surfaces to the soil infiltration zone. The control system optionally includes a media filter device that may be installed within the conveyance system to intercept sediment and other contaminants prior to discharge within the underlying soil infiltration zone.

16 Claims, 15 Drawing Sheets

STORMWATER CONTROL SYSTEM AND RELATED METHOD

CROSS REFERENCE TO RELATED APPLICATION

This application is a continuation-in-part, and claims the priority benefit, of U.S. application Ser. No. 12/550,480, filed Aug. 31, 2009, now U.S. Pat. No. 7,988,851, entitled STORMWATER CONTROL SYSTEM AND RELATED METHOD, of the same inventors and assigned to the same assignee. The entire content of that priority application is incorporated herein by reference.

BACKGROUND OF THE INVENTION

1. Field of the Invention

The present invention relates generally to the control and treatment of stormwater prior to discharge to localized infiltration zone soils. More particularly, the present invention relates to a system for diverting stormwater through compacted soil fill material to the infiltration zone soils.

2. Description of the Prior Art

Stormwater is rainwater that when falling on a developed environment will most often collect contaminants from the built surfaces and subsequently carry these unwanted contaminants to streams and lakes. Controlling stormwater runoff from a developed property has traditionally involved the use of systems of catch basins and pipes to catch and convey the water to centralized areas for storage and or treatment prior to discharging to either the ground or to a downstream surface water body. Although the main goals for using these traditional stormwater control systems is the prevention of flooding of downstream properties, reducing erosion of creeks and attempting to maintain water quality, the level of success in meeting these goals has been questioned.

Relatively recently, the idea that not focusing the stormwater to centralized storage and treatment areas, but instead treating and discharging the stormwater nearer to where it falls from the sky is gaining support. These new ideas and the associated techniques to implement these ideas are today called Low Impact Development (LID).

The use of porous pavement and related surfaces is one of these LID techniques that has gained acceptance as a storm control system. An alternative to catching and focusing rainwater toward centralized areas, the use of porous surfaces allows the water to soak into the existing soils approximately at the same location where the raindrop first hits the ground surface. The intent is that the water does not runoff the developed surfaces and therefore is not focused to centralized areas. The rainwater instead continues to follow the same approximate subsurface flow path after development as it did prior to development. This same idea can be achieved using traditional impermeable surfaces if multiple inlets are placed throughout the surface in a manner not generally recognized in current design technology.

At this time given the current technology, a significant limitation to these practices associated with the use of these porous surfaces for stormwater control purposes exists. In areas where compacted soil fill embankments are required based on existing topographic and/or other conditions, the use of porous surfaces may not be compatible. This is due to the fact that a compacted soil fill embankment that is constructed between the built porous surface and the existing ground soils essentially blocks the hydraulic connection between these surfaces and thus inhibits the water from traveling vertically downward as needed. On this basis, it is currently recognized that porous pavements sections and related surfaces should not be constructed over significant compacted soil fill embankment areas. Therefore, the current invention is needed.

Another recognized problem associated with the stormwater contacting the built surfaces is water quality degradation. Therefore, prior to allowing discharge of the water to native soils for infiltration or discharge to downstream water bodies it must be treated or filtered. Traditionally the use of centralized storage and treatment facilities has complicated this issue more as higher flows must be treated. In addition, filter systems presently used are centralized substantial structures. They include a plurality of individual filter assemblies in one or a very few common locations for a large developed property, for example. The failure or blockage of just a few of the assemblies, as well as regular maintenance, requires the shutdown of the centralized system, thereby exposing a substantial portion of the developed property to the generation of untreated stormwater.

What is needed is a stormwater control system suitable for use with pervious built surfaces or impervious built surfaces located over compacted fill material including, but not limited to, soil fill material. What is also needed is such a control system that transfers the stormwater to underlying local native infiltration zone soils. Further, what is needed is such a system that may also include a filter device that is localized rather than centralized.

SUMMARY OF THE INVENTION

It is an object of the present invention to provide a stormwater control system and related method suitable for handling stormwater on pervious built surfaces or impervious built surfaces located over compacted soil fill material. It is also an object of the present invention to provide such a control system that transfers the stormwater to underlying local native infiltration zone soils. Further, it is an object of the present invention to provide a stormwater control system that optionally includes a filter device that is localized rather than centralized.

These and other objects are achieved with the present invention, which is a total drainage system and method that facilitates the hydraulic connection between built pervious or impervious surfaces and the underlying native infiltration zone soils has been proposed. Rainwater falls onto the surface and is relatively immediately conveyed and discharged to the underlying soils in the local general area and not sent to a centralized area. Localized filters are installed if desired within standpipes of the system to remove sediment and pollutants from the water as it passes from the built surface to the soil. Given the relatively small amount of surface area delivered to any single filter, the treatment flows and requirements are simplified and the filters are more compact and easier to manage in regards to installation and maintenance.

It is an aspect of the present invention to provide a system apparatus and method to convey stormwater from the built surface generally downward through a compacted fill soil to the infiltration zone soils located near and below where the rainwater first contacted the ground. It is another aspect of the invention to provide a system apparatus to discretely or non-discretely discharge stormwater into infiltration zone soils in a manner similar to the natural pre-developed condition thus limiting focusing of stormwater to any single infiltration zone soil.

It is still another aspect of the invention to provide a system apparatus to catch stormwater flowing through a built porous surface and convey the water generally downward through a compacted fill soil embankment to the infiltration zone soils located near and below where the rainwater first contacted the ground.

It is a further aspect of the invention to provide a means to backflow and clean clogged built porous surfaces by hydrostatically forcing water backwards through the porous surface.

It is still another aspect of the invention to provide a system apparatus to catch stormwater within open inlets located on the surface of the built impervious surface or in depressed basins constructed within the built impervious surface.

It is a further aspect of the invention to provide an optional apparatus to filter contaminants from the stormwater prior to discharging the water to the infiltration zone soils, wherein the filter apparatus includes at least one filter device for each standpipe. The filter device may be an active device, a passive device, a device treated to attract contaminants of interest, a miniaturized version of conventional filter cartridge assemblies, other types of high surface area retention means, such as string or strand sets positionable within the fluid flow path, or any other type of filter device suitable for insertion into a standpipe and configured to remove particulate and other contaminants of a type and size of interest with minimal adverse impact on the flow of stormwater through the standpipe.

It is still another aspect of the invention to provide a system apparatus that allows catchment of stormwater before focusing and merging with other stormwater thus minimizing the magnitude of water quantity to be conveyed, treated and discharged.

In one embodiment of the invention suitable for use with a pervious surface, the stormwater control system includes a first array of porous pipes positioned below and substantially parallel with the surface, a standpipe structure coupled to the array of porous pipes and passing through material, including but not limited to, a compacted fill embankment, and a second array of porous pipes positioned between the material and the infiltration zone soil and substantially parallel with that soil. The optional filter assemblies may be included one for each standpipe structure but not limited thereto. A secondary conduit may extend from the standpipe structure to operate as a hydraulic grade line control, whether for the control system is used for a pervious surface or an impervious surface.

In another embodiment of the invention suitable for use with an impervious surface, the stormwater control system includes a plurality of catch basins, a standpipe structure passing through material, including but not limited to, a compacted soil fill embankment, and connected directly or indirectly through an array of conduits to the catch basins and an array of porous pipes positioned between the material and the infiltration zone soil and substantially parallel with that soil. A filter may or may not be included in one or more portions of the standpipe structure. The secondary conduit may extend from the standpipe structure to operate as a hydraulic grade line control in this embodiment of the invention.

In one or more embodiments, the system includes filter fabrics adjacent to the porous pipes to capture particulates that would otherwise pass into the material underlying the surface and/or the infiltration zone soil. The system may optionally include a mechanism for backflushing the system including the perforated pipes of the perforated pipe array. Further, the system including a filter in the standpipe structure may optionally include a siphon mechanism within the filter to enhance filter operation if desired.

The stormwater control system includes a conduit providing fluid communication between an upper inlet area through a compacted fill embankment to the lower discharge area within the underlying soil infiltration zone. That conduit is also referred to herein as a standpipe structure, which standpipe structure may also include the optional filter. The filter may be positioned so that it is accessible for maintenance, including replacement, from the built ground surface through a removable cover. The stormwater control system may be used with pervious and impervious surfaces. The upper inlet area includes an array of perforated conduits for the pervious surface stormwater control. The system may include a means to clean porous built surfaces by fluid pressurizing the perforated conduits, wherein voids below the porous built surface are then pressurized resulting in an upwards flow of water (backwash) to dislodge sediment and other materials deposited and potentially blocking the voids contained within the upper porous built surface.

The stormwater control system for controlling stormwater on the impervious surface may not require the use of one or more catch basins when concentrating or focusing of stormwater is minimized and the surface area size of the infiltration zone soil below the compacted fill is roughly equivalent to the surface area size of the impervious surface located above the compacted fill. In that instance, the system may include one or more standpipes in fluid communication with the impervious surface for receiving stormwater runoff from the impervious surface, wherein the one or more standpipes extend through the compacted soil fill material, and the grid of stormwater delivery pipes described herein, or such other means for transferring the stormwater from the one or more standpipes to the infiltration zone soil in a manner that disperses the stormwater substantially throughout the infiltration zone soil. Rocks or other types of void creating structures may be suitable for that. Alternatively, the stormwater control system for controlling stormwater on the impervious surface may not require one or more standpipes when concentrating or focusing of stormwater is minimized and where the surface area size of the infiltration zone soil below the compacted fill is roughly equivalent to the surface area size of the impervious surface located above the compacted fill and the control system includes one or more catch basins in fluid communication with the impervious surface and the means for transferring described above. The stormwater control system and related method of the present invention enable removal of water and entrained particulates from pervious and impervious surfaces and transfers the water to the local infiltration soil zone, including local infiltration zones underlying compacted fill, such as compacted fill soils, but not limited thereto. These and other advantages of the invention will become more apparent upon reviewing the following detailed description, the accompanying drawings and the appended claims.

DETAILED DESCRIPTION OF THE PREFERRED EMBODIMENTS

Figure 1:
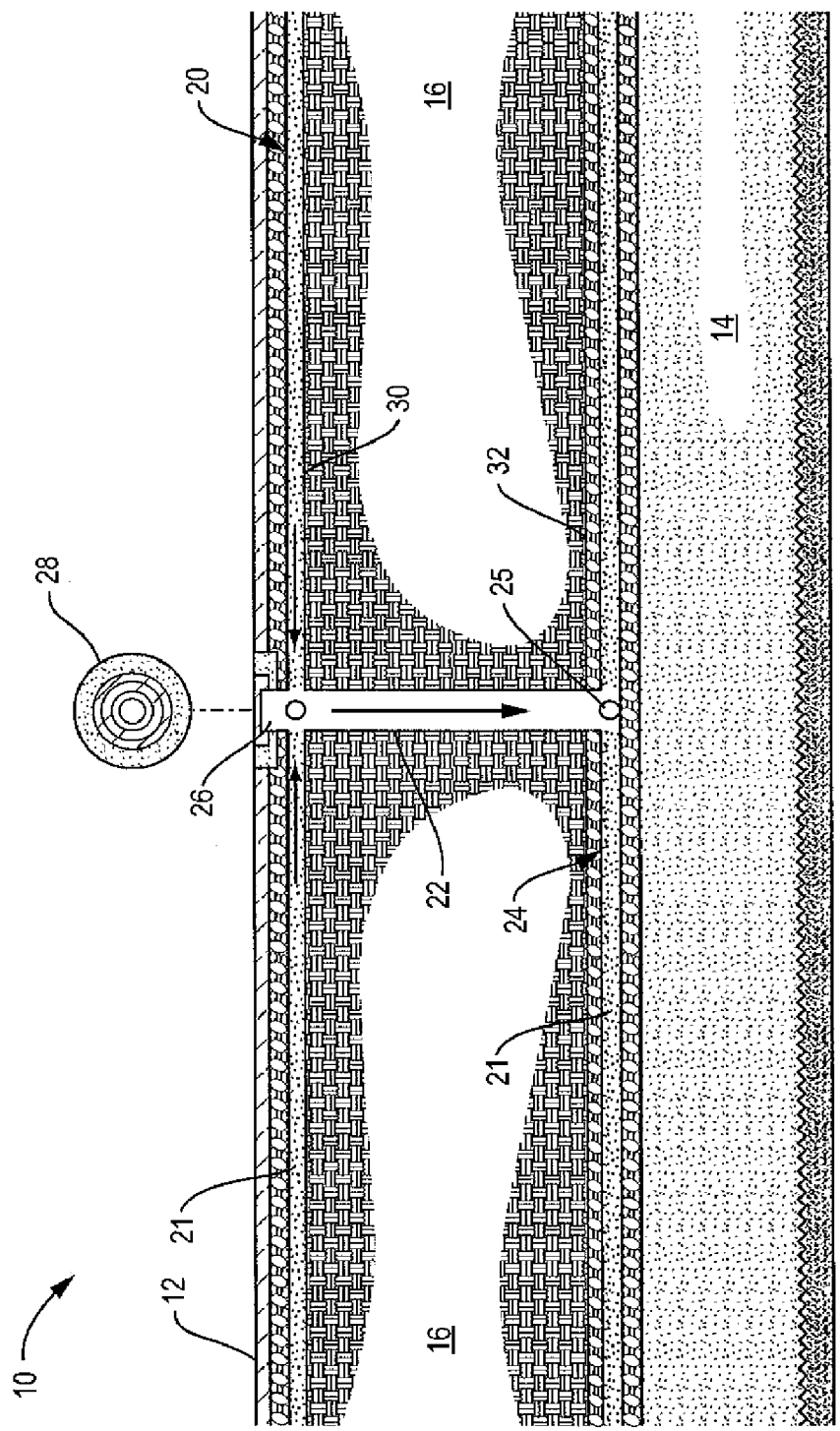
FIG. 1 is a section elevation view of a first embodiment of the system of the present invention located under a built pervious surface.
Figure 2:
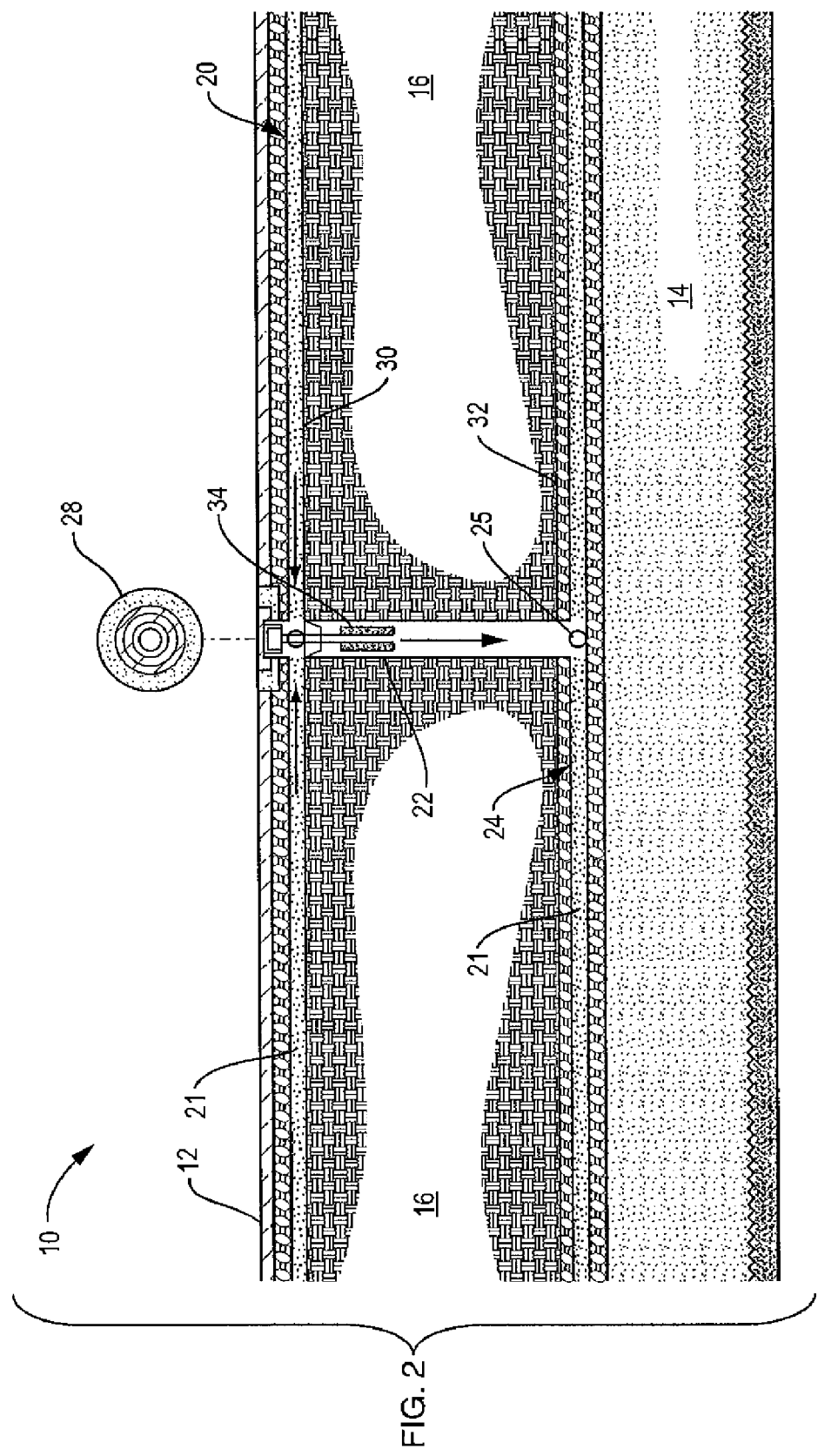
FIG. 2 is a section elevation view of the first embodiment of the system including an optional filter cartridge assembly installed within the standpipe.

A first embodiment of the present invention is stormwater control system 10 shown in FIGS. 1-4B. The stormwater control system 10 is used to transfer liquid from pervious surface 12 to infiltration zone soil 14 located under the pervious surface 12 for the situation in which relatively non-absorbing material, such as compacted fill embankment material 16, such as compacted soil fill but not limited thereto, is located between the surface 12 and infiltration zone soil 14. The stormwater control system 10 is configured to ensure that liquid on the surface 12 is managed locally in the vicinity of where it exists rather being transfer to a remote liquid handling system, such as a municipal conveyance or treatment facility. It is to be understood that the infiltration zone soil 14 is configured in a manner known to those of skill in the art to handle anticipated stormwater runoff conditions. For purposes of describing the present invention, compacted fill embankment 16 refers to any change made to the elevation of a built surface relative to the existing grade where the compacted material is anything other than undisturbed native soil.

The control system 10 includes a first grid 20 of stormwater receiving pipes, one or more standpipes 22 and a second grid of stormwater delivery pipes 24. The receiving pipes of first grid 20 and the delivery pipes of second grid 24 may be of the same type. The pipes are arranged to enable fluid to enter and/or exit along their lengths through perforations 21 rather than solely at their ends. Perforated pipes have been determined to be suitable for that purpose. The first grid 20 and the second grid 24 may be aligned approximately in parallel with one another but not limited thereto. The first grid 20 and the second grid 24 may be aligned approximately in parallel with either or both of the surface 12 and the soil 14 but not limited thereto. The pipes of the second grid 24 include one or more receiving ports 25 coupled to the standpipes 22 for the purpose of receiving stormwater therefrom.

The standpipes 22 are generally configured to provide conduits to pass stormwater from the first grid 20 to the second grid 24. The standpipes 22 are aligned approximately orthogonally with respect to the orientation of the surface 12 but not limited thereto. The standpipes 22 may be accessed from the surface 12 by way of one or more access ports 26 that may simply be holes with cleanout covers 28 or they may be incorporated into one or more catch basins. The cleanout covers 28 are sealable with traffic bearing capacity. The system 10 may further optionally include a first array of filter material, such as first filter fabric 30, positioned below and adjacent to the first grid 20 of pipes with respect to the surface 12 to trap any fine particulates that may pass through the pipes to the compacted soil fill material 16, and a second array of filter material, such as second filter fabric 32, positioned above and adjacent to the second grid 24 of pipes with respect to the surface 12 to limit the introduction of fine particulates into the second grid 24 from the compacted soil fill material 16.

In operation, the system 10 functions as follows. Stormwater permeating through the surface 12 enters the first grid 20 of pipes and flows into the standpipes 22. It is then conveyed through the compacted fill material 16 by way of the standpipes 22 to the second grid 24 of pipes and then discharges into the infiltration zone soils 14.

Figure 3:
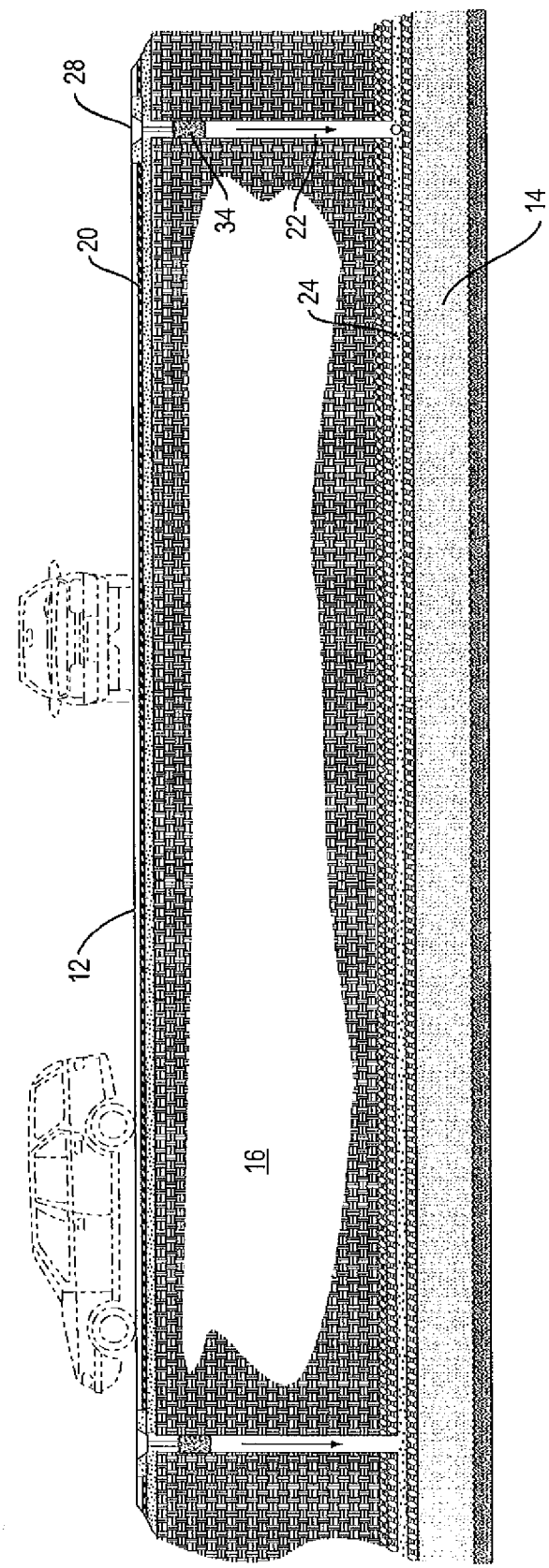
FIG. 3 is a wider section elevation view of the first embodiment of the system including the optional filter cartridge assembly.

Optionally, the system 10 may include for each of the standpipes 22 at least one filter device, such as a filter cartridge assembly 34, as shown in FIGS. 3 and 4. The filter cartridge assembly 34 is configured to intercept and retain contaminants, such as sediments and chemicals, mixing with the stormwater as it flows on the surface 12. A miniaturized version of stormwater filter cartridge assemblies have been determined to be suitable for that purpose. The inclusion of the filter cartridge assembly 34 in each of the standpipes 22 localized the filter function, making it easier to complete installation and maintenance functions with minimal impact on the operation of other standpipes 22. The filter cartridge assembly 34 may be of any design suitable for the indicated purpose and arranged to fit within the dimensions of the standpipes 22 as determined by the particular stormwater control application.

Figure 4A:
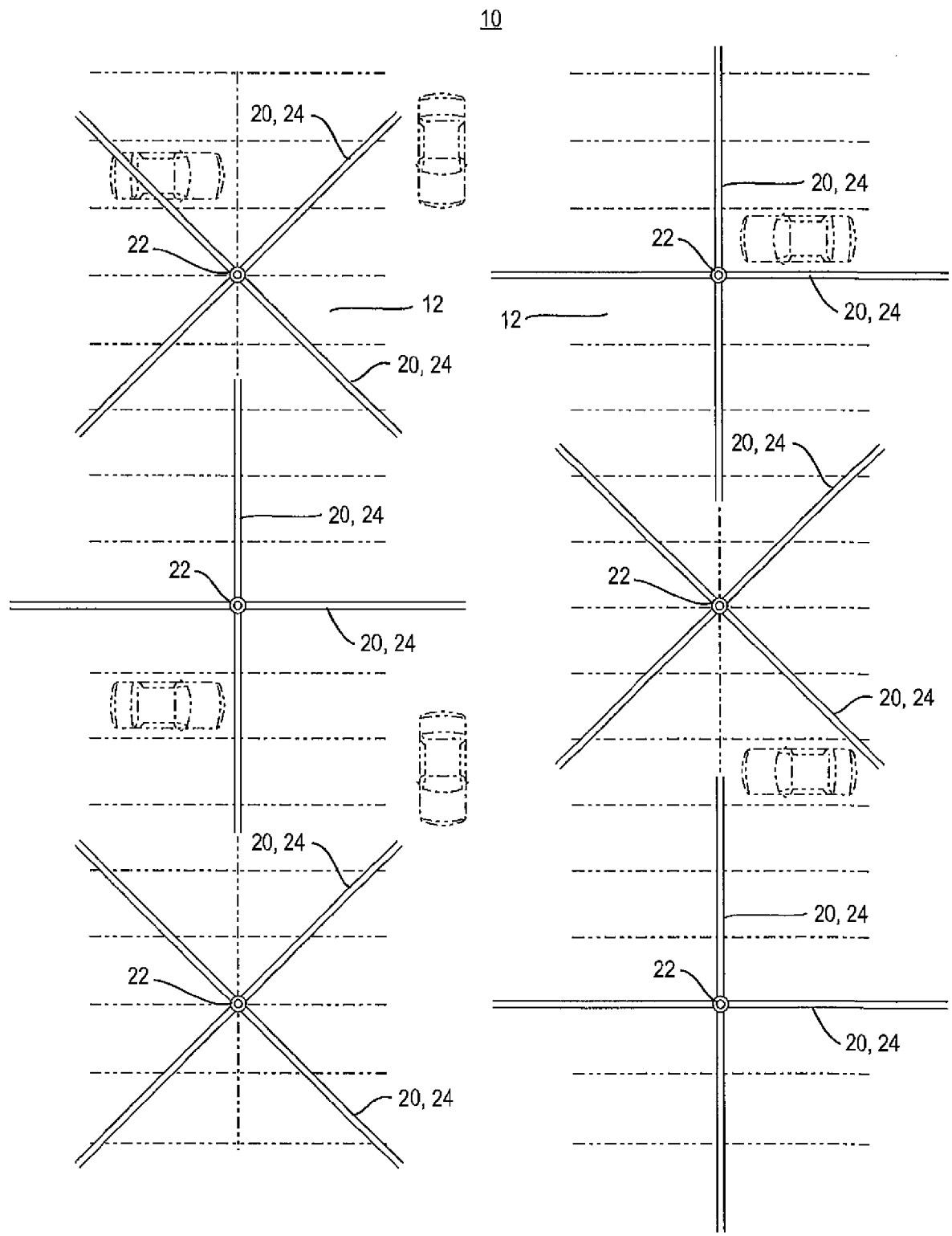
FIG. 4A is a plan view of the wider section of a first arrangement of the first embodiment of the invention showing portions of the system.
Figure 4B:
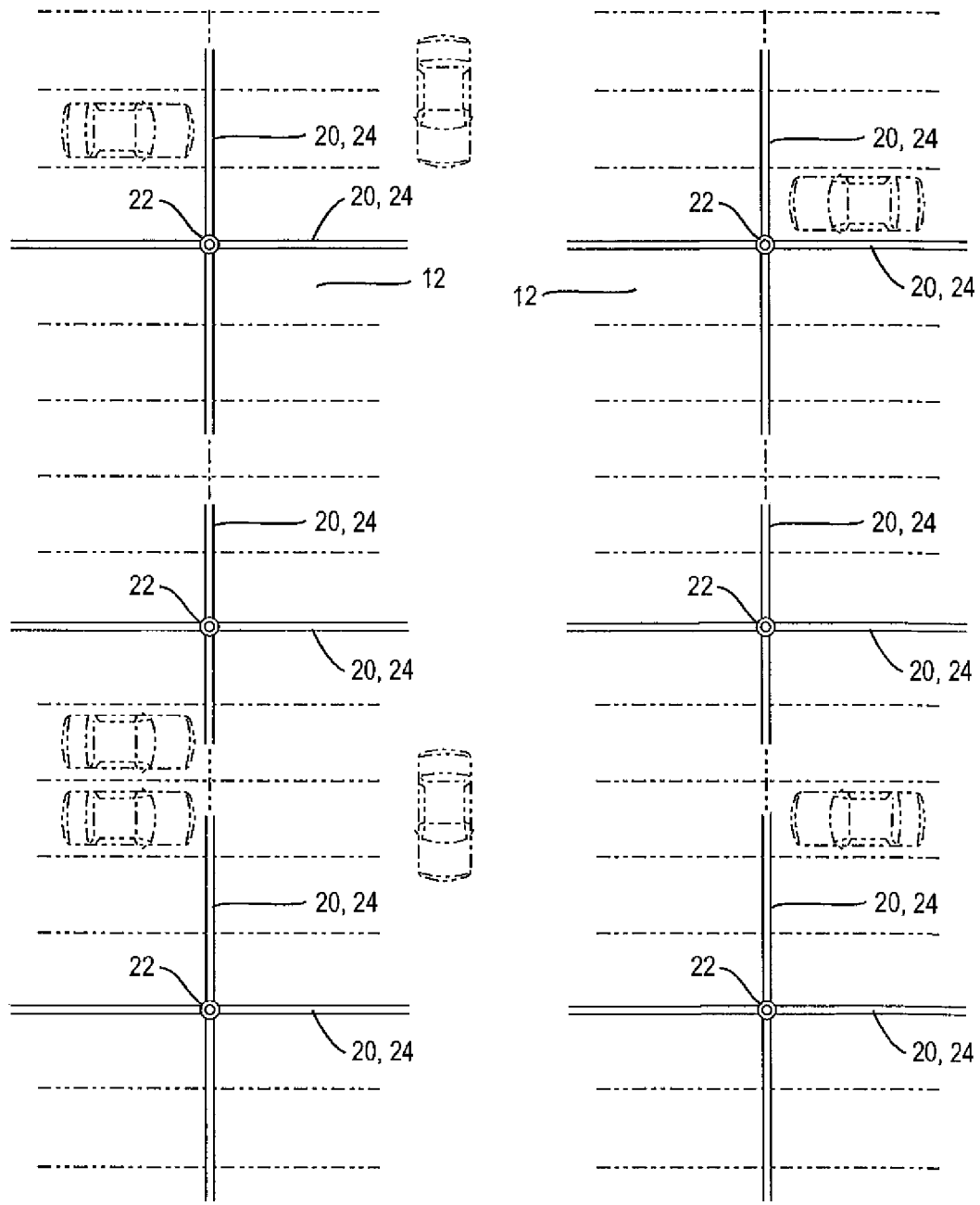
FIG. 4B is a plan view of the wider section of a second arrangement of the first embodiment of the invention showing portions of the system.
Figure 5:
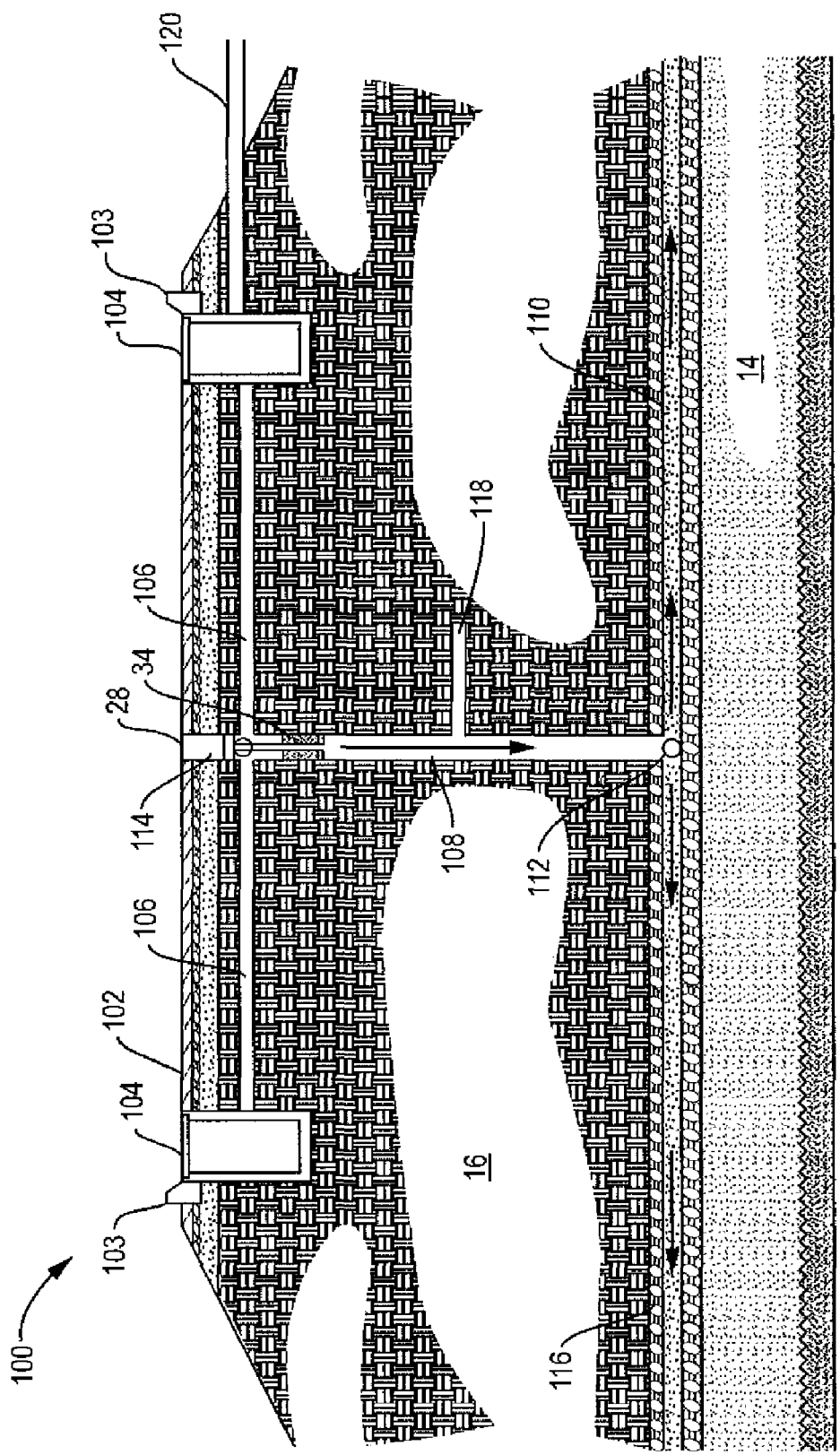
FIG. 5 is a section elevation view of a second embodiment of the system of the present invention located under a built impervious surface with a crowned sloped surface section and including an optional filter cartridge assembly installed within the standpipe.

It can be seen in FIGS. 4A and 4B, that either or both of the first grid 20 and the second grid 24 may be arranged in any one or more of orthogonal, parallel and diagonal orientations. Further, the standpipes 22 may be interconnected, including in parallel, orthogonally and/or diagonally.

Figure 6:
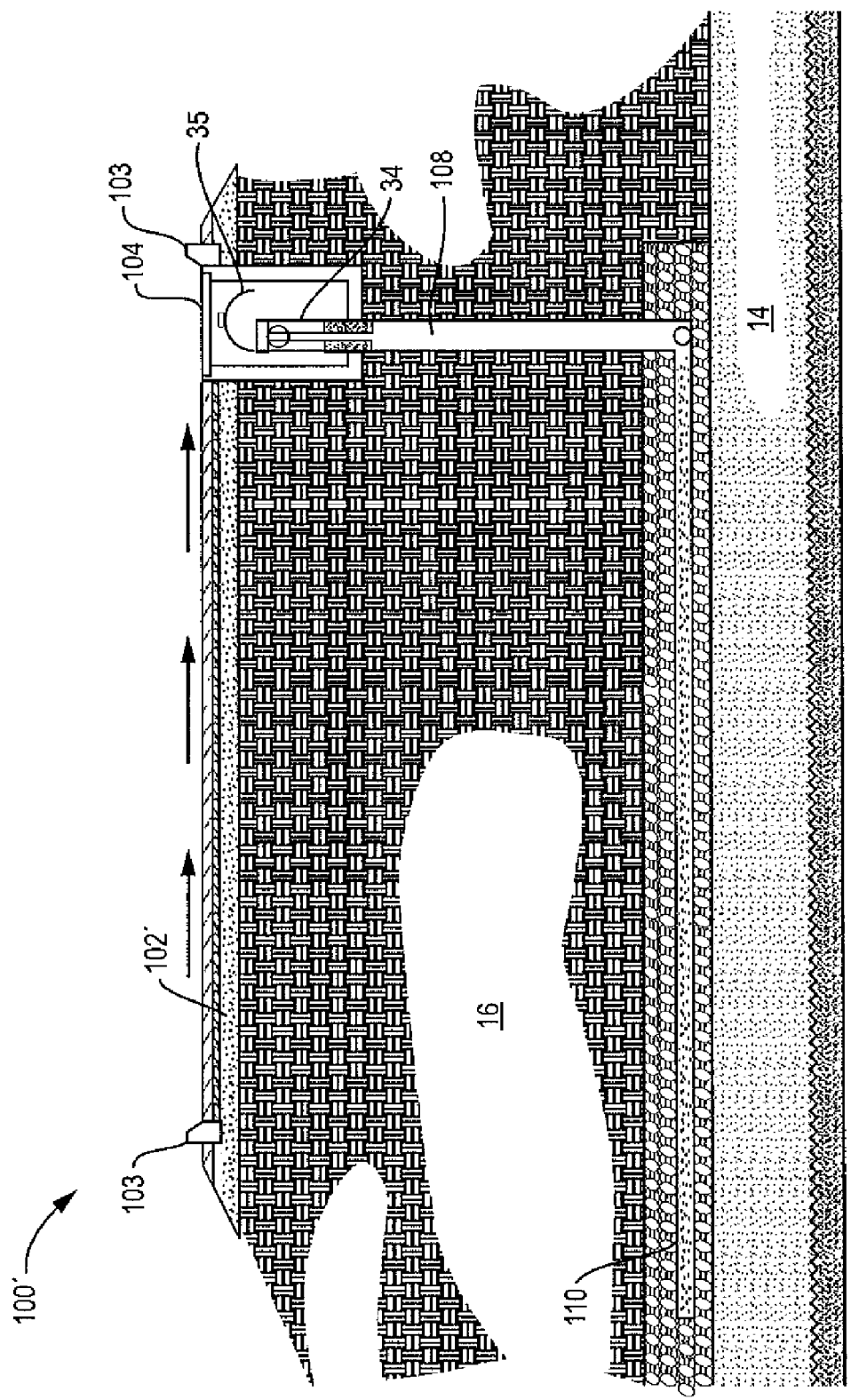
FIG. 6 is a section elevation view of an alternative version of the second embodiment of the system located under a built impervious surface with a cross sloped surface section including the optional filter cartridge assembly and showing an optional cartridge insertion and retrieval attachment.
Figure 7:
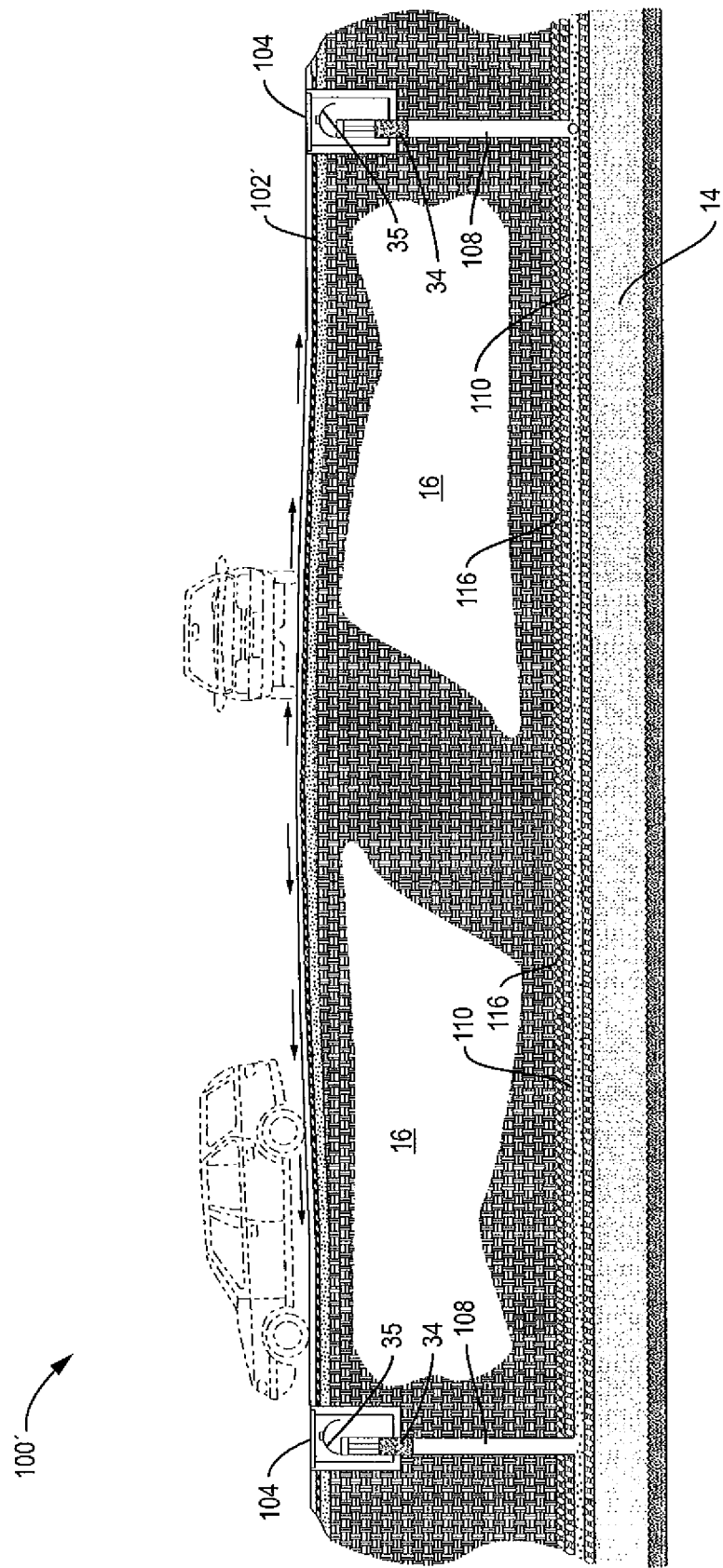
FIG. 7 is a wider section elevation view of the version of the second embodiment of the system of the present invention shown in FIG. 7.

A second embodiment of the present invention is stormwater control system 100 is shown in FIGS. 5-8B, with FIGS. 6 and 7 showing a second version of the second embodiment. The stormwater control system 100 is used to transfer liquid from impervious crowned sloped surface 102 with roadside curbs 103 to the infiltration zone soil 14 located under the impervious surface 102 for the situation in which the relatively non-absorbing material, such as compacted fill embankment material 16, is located between the surface 102 and the infiltration zone soil 14. The stormwater control system 100 is configured to ensure that liquid on the surface 102 is managed locally in the vicinity of where it exists rather being transfer to a remote liquid handling system, such as a municipal treatment facility. It is to be understood that the infiltration zone soil 14 is configured in a manner known to those of skill in the art to handle anticipated stormwater runoff conditions.

The control system 100 includes an array of catch basins 104, an array of catch basin conduits 106, one or more standpipes 108 and a grid of stormwater delivery pipes 110. The catch basins 104 are configured to receive stormwater that flows across the impervious surface 102 and may be configured in a manner known to those of skill in the art as similar to smaller versions of the types of catch basins used in typical stormwater control systems forming part of larger municipal stormwater control systems. They may include typical oil-water separators. The catch basins 104 are connected to the conduits 106, which are arranged to receive the stormwater from the catch basins 104 and transfer it to the one or more standpipes 108. The standpipes 108 are arranged to transfer the stormwater to the delivery pipes 110. The delivery pipes 110 include one or more receiving ports 112 coupled to the standpipes 108 for the purpose of receiving stormwater therefrom. The delivery pipes 110 are arranged to enable fluid to exit along their lengths rather than solely at their ends. Perforated pipes have been determined to be suitable for that purpose. The basin conduits 106 and the grid of delivery pipes 110 may be aligned approximately in parallel with one another but not limited thereto. The basin conduits 106 and the delivery pipes 110 may be aligned approximately in parallel with either or both of the surface 102 and the soil 14 but not limited thereto.

The standpipes 108 are generally configured to provide means to pass stormwater from the basin conduits 106 to the delivery pipes 110. The standpipes 108 are aligned approximately orthogonally with respect to the orientation of the surface 102 but not limited thereto. The standpipes 108 may be accessed from the surface 102 by way of one or more access ports 114 that may simply be holes with cleanout covers 28 or they may be incorporated into one or more catch basins similar to the catch basins 102. The cleanout covers 28 are sealable with traffic bearing capacity. The system 10 may further optionally include an array of filter material 116, such as a filter fabric, positioned above and adjacent to the delivery pipes 110 with respect to the surface 102 to limit the introduction of fine particulates into the delivery pipes 110 from the compacted material 16.

In operation, the system 100 functions as follows. Stormwater running across the surface 102 enters the catch basins 104 and flows to the basin conduits 106 for transfer to the standpipes 108. It is then conveyed through the compacted fill embankment 16 by way of the standpipes 108 to the delivery pipes 110 from where it discharges into the infiltration zone soils 14.

Optionally, the system 100 may include for each of the standpipes 108 at least one filter cartridge assembly 34. As indicated with regard to the control system 10 of the present invention, the filter cartridge assembly 34 is configured to intercept and retain contaminants, such as sediments and chemicals, mixing with the stormwater as it flows on the surface 102. The filter cartridge assembly 34 may be of any design suitable for the indicated purpose and arranged to fit within the dimensions of the standpipes 108 as determined by the particular stormwater control application.

The control system 100 may further include one or more hydraulic grade line conduits 118 coupled to the standpipe 108 and configured to control hydraulic head within the system 100. When the control system 100 is located on a slope, the hydraulic buildup in the drainage rock zone could create an undesired slide potential in an adjacent area. The use of the grade line conduits 118 ensures that when the hydraulic pressure within the system 100 reaches a certain level, the stormwater within the standpipe 108 will divert through the conduits 118 to another location. In one example, a plurality of conduits 118 may be linked together to ensure that the hydraulic pressure does not exceed a selectable level for a relatively wide area. It is to be noted that the conduits 118 may also be employed with the system 10 used in association with the pervious surface. Additionally, for system 100, one or more of the catch basins 104 may include a basin overflow conduit 120 for the purpose of enabling direct stormwater discharge to a larger control system as needed under certain limited conditions of rare storm events.

As indicated, FIGS. 6 and 7 show a second version of the system 100' configured for a cross sloped surface 102'. The system 100' includes the standpipe 108 directly joined to the catch basin 104 so that there is no need for the basin conduit 106 interface that forms part of system 100 of FIGS. 5 and 6. As also shown in FIG. 7, the filter cartridge assembly 34 includes an inverted elbow 35 used as an oil-water separator device. That is, the inverted elbow 35 acts to block oil and other coarse lighter-than-water contaminants resting on the surface of the stormwater from entering the standpipe 108. The inverted elbow is also optionally fabricated with sufficient structural integrity to act as a grab bar to allow ease of access to the filter cartridge assembly 34 for maintenance thereof when recessed within the standpipe 108. The inverted elbow 35 may be metallic or nonmetallic and is shown represented as a curved bar but is not limited thereto. The inverted elbow 35 is fabricated with sufficient strength to support the filter cartridge assembly 34 and to withstand the environment within the catch basin 104. The inverted elbow 35 may be employed with any cartridge filter assembly 34 described in all embodiments of the system of the present invention.

Figure 8A:
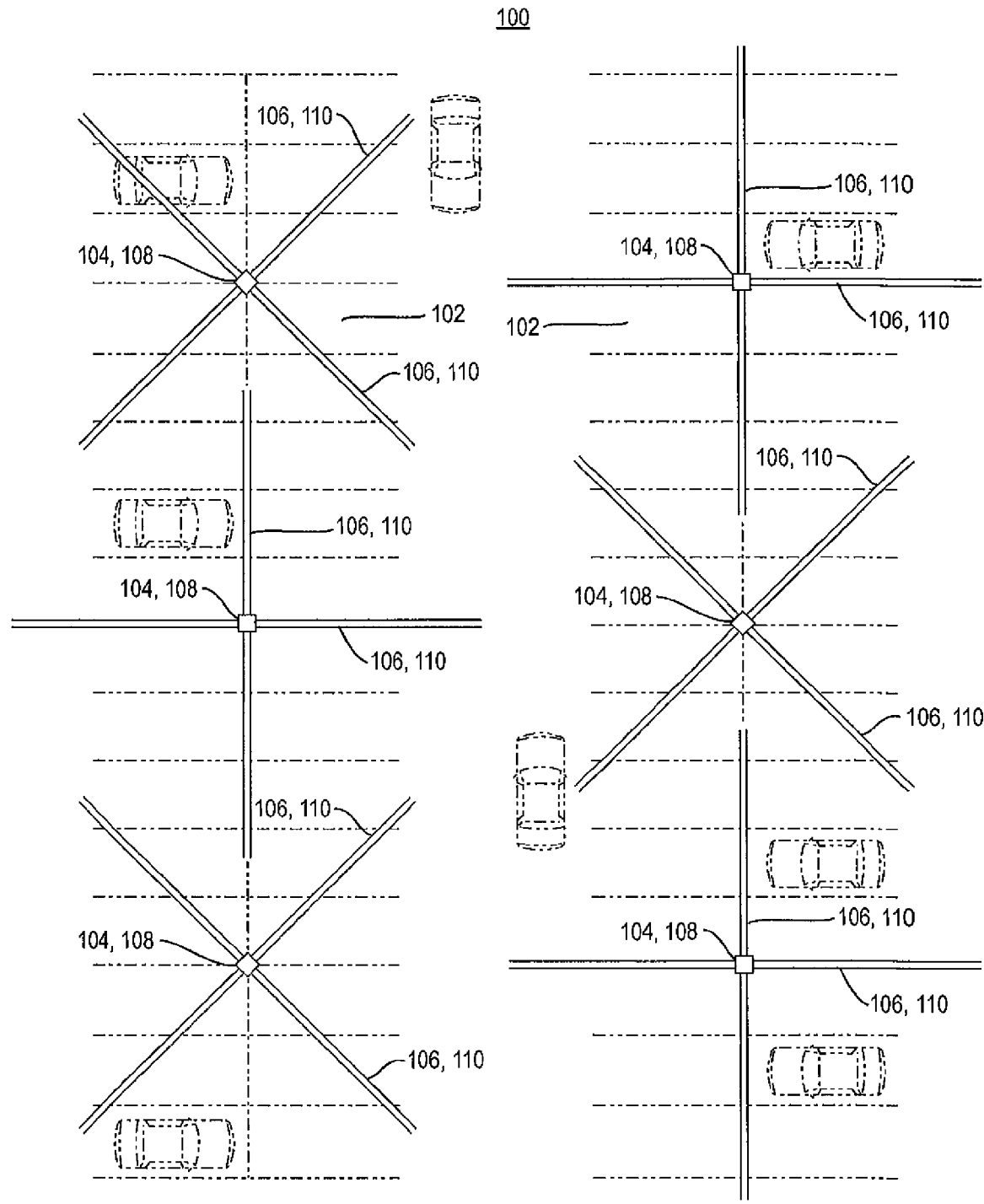
FIG. 8A is a plan view of the wider section version of a second arrangement of the second embodiment of the invention showing portions of the system.
Figure 8B:
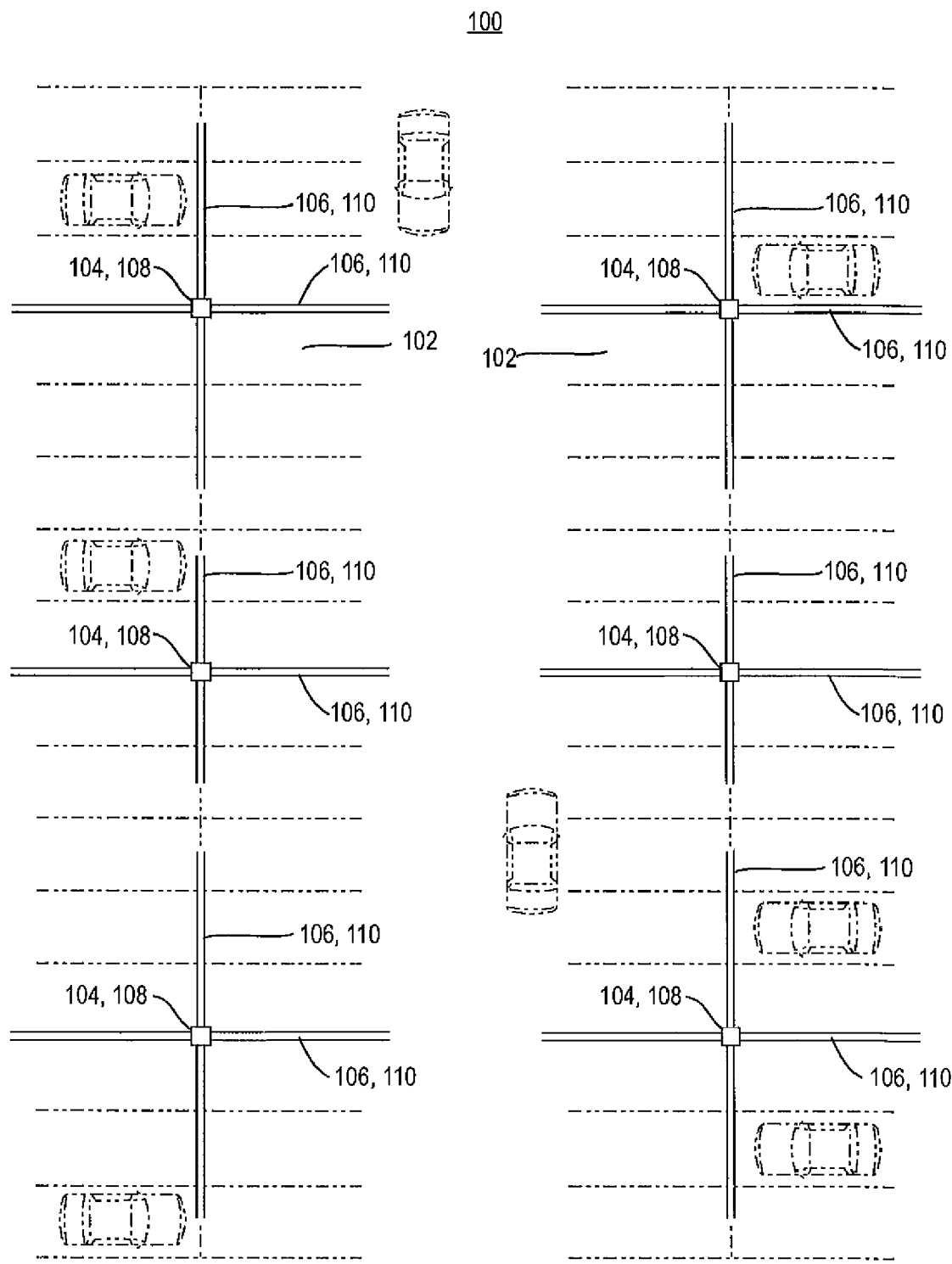
FIG. 8B is a plan view of the wider section version of a second arrangement of the second embodiment of the invention showing portions of the system.

It can be seen in FIGS. 8A and 8B that one or more of the basin conduits 106, delivery pipes 110 and conduits 118 may be arranged in any one or more of orthogonal, parallel and diagonal orientations. Further, the standpipes 108 and associated catch basins 104 may be interconnected, including in parallel, orthogonally and/or diagonally.

Figure 9:
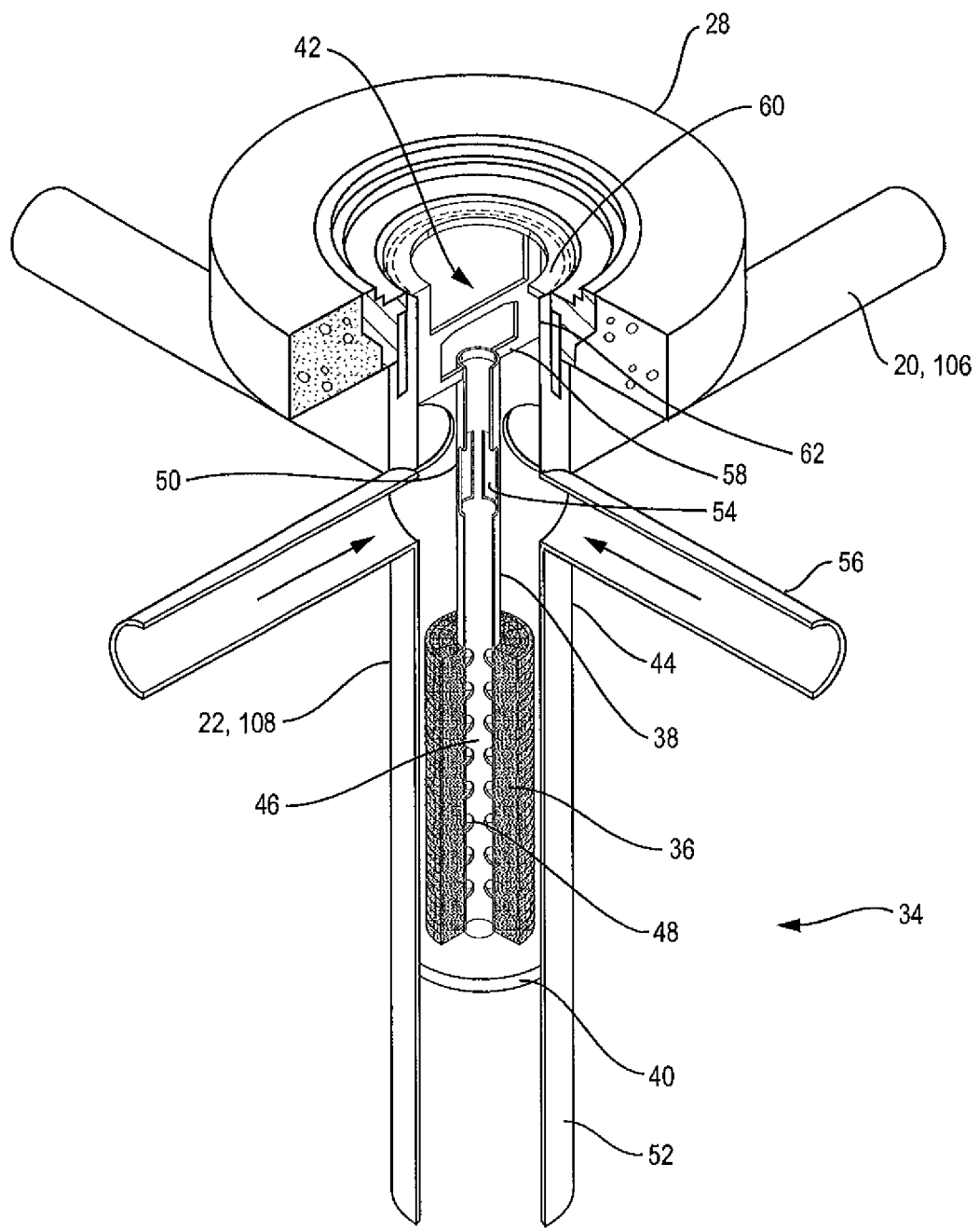
FIG. 9 is a partial cutaway perspective view of an embodiment of a standpipe with filter cartridge assembly installed.
Figure 10:
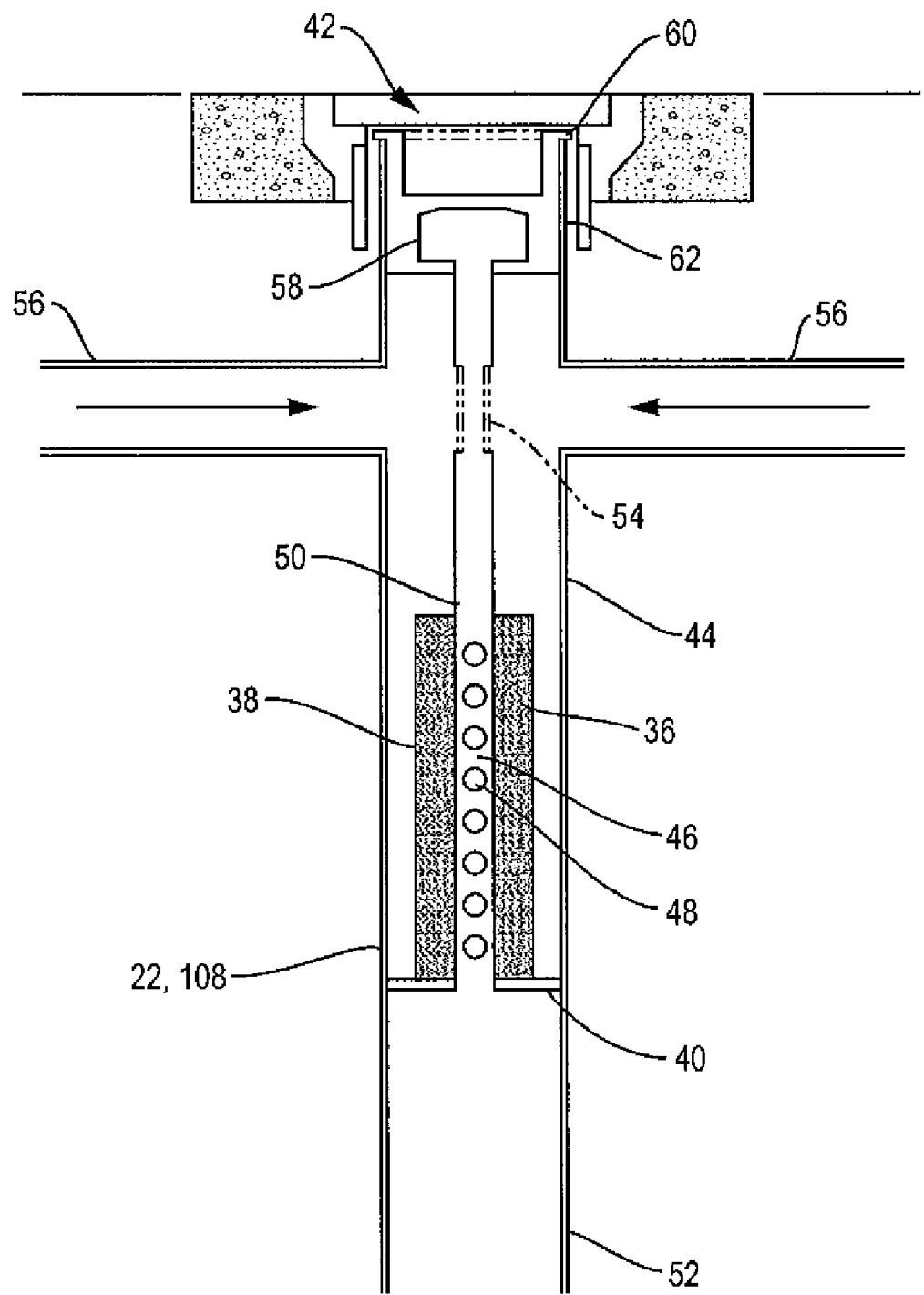
FIG. 10 is a section elevation view of the embodiment of the standpipe with filter cartridge assembly shown in FIG. 9.
Figure 11:
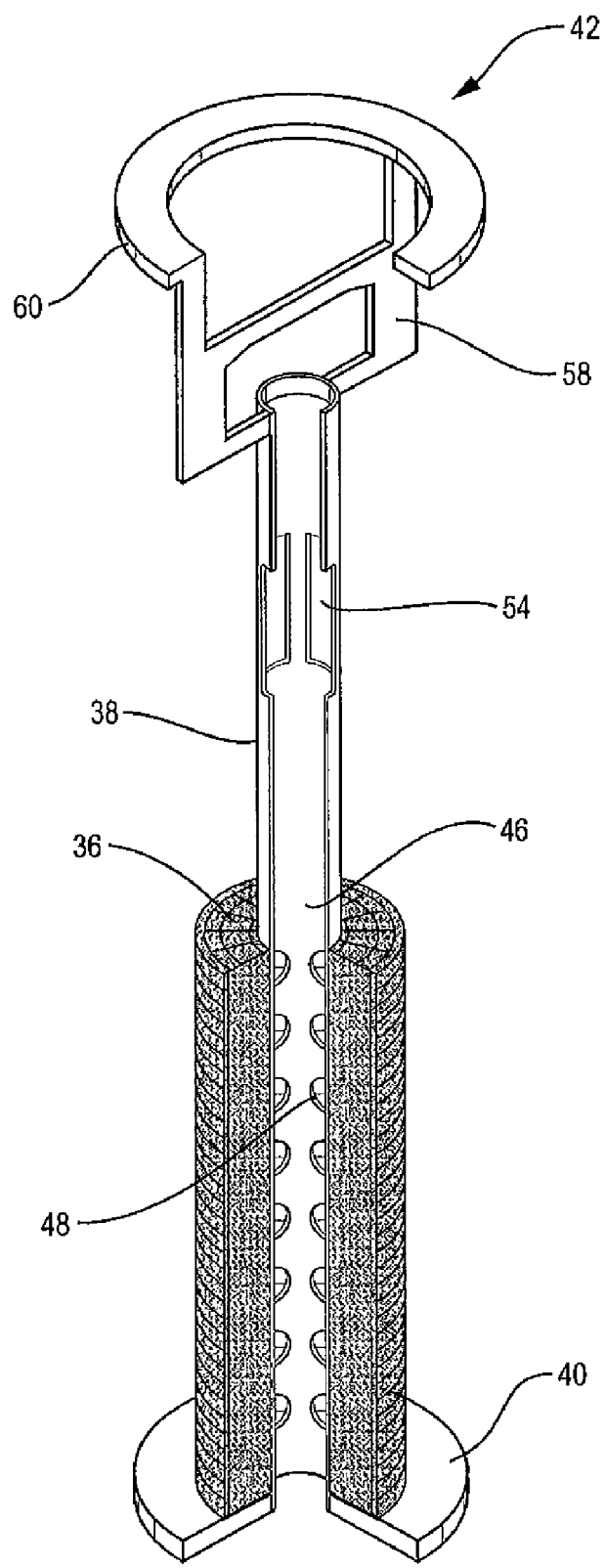
FIG. 11 is a partial cutaway perspective view of an embodiment of a filter cartridge assembly showing the handle and support shaft.

For those versions and embodiments of the present invention including the optional filter device such as filter cartridge assembly 34, an example of a suitable form of the assembly 34 is shown in FIGS. 9-11. The assembly 34 is preferably gasketed to ensure that all water flowing into the standpipes 22/108 must pass through filter media 36 of the filter cartridge before transfer to the grid of delivery pipes below the compacted material. The assembly 34 includes the filter media 36 positionable within the standpipe 22/108, an adjustable discharge cylinder 38, a support base 40 and an adjustable handle 42. While the assembly 34 is shown in the drawings as positioned under a cleanout cover 28, it may also be used in a catch basin 104. In operation, stormwater entering the standpipe 22/108 contacts the filter media 36 at upper standpipe region 44. It passes through the filter media 36, which collects particulates, and the filtered stormwater passes to inner drainage space 46 through inner drainage ports 48 of internal conduit 50. It then moves from the inner drainage space 46 to lower standpipe region 52. The filter media 36 is retained on support base 40 and if the stormwater level in the assembly 34 exceeds capacity, overflow not passing through the filter media 36 may pass into the internal conduit 50 through filter overflow port 54. The filter device preferably substantially fills the standpipe 22/108 and further, optionally is sealed to the internal walls of the standpipe 22/108.

An upper section of the adjustable handle 42 includes a grab ring 58 for ease of insertion and removal for maintenance. The handle 42 is adjustable to enable the user to position it within the standpipe 22/108 where desired. The handle 42 also includes a perimeter flange 60 that is arranged to sit on filter stop frame 62 associated with the standpipe 22/108.

Figure 12:
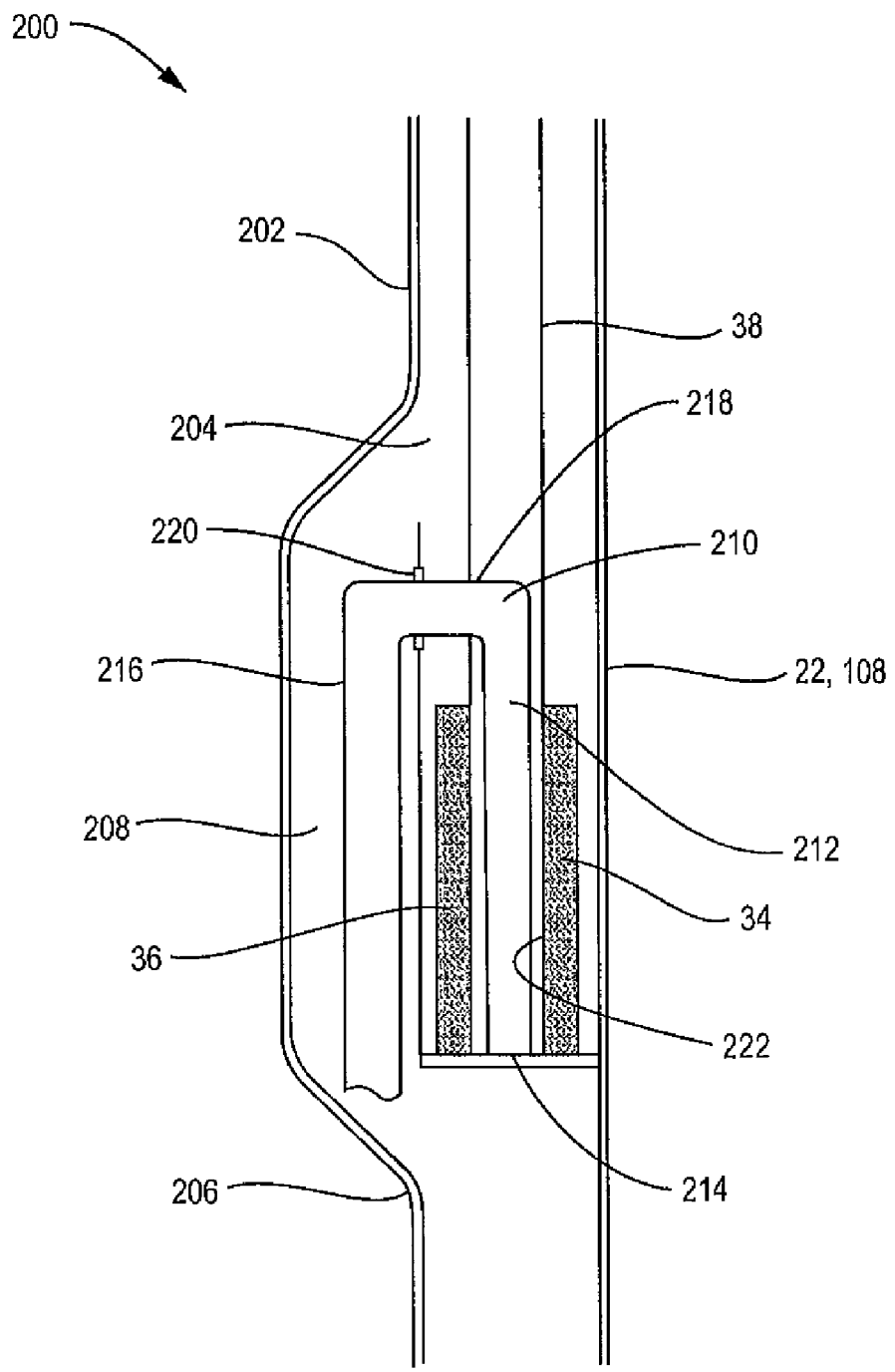
FIG. 12 is a section elevation view of an embodiment of a standpipe with added appendage piping for a filter cartridge assembly installed with alternative outlet assembly including siphon.

A modified design of a standpipe 200 of the type that includes a filter cartridge assembly 34 is shown in FIG. 12. The standpipe 200 includes upper region 202 of primary conduit 204 and lower region 206 of primary conduit 204 above and below, respectively, the filter cartridge assembly 34. Additionally, the standpipe 200 includes a discharge overflow conduit 208 and a siphon tube 210. The siphon tube 210 includes backup section 212 positionable within internal conduit 50 or combined as conduit 50 of the filter cartridge assembly 34. The backup section 212 is arranged to receive water through port 214 that has entered internal conduit 50 after passing through filter media 36. It is in fluid communication with siphon return section 216 that is, in turn, in fluid communication with backup section 212 by way of filter support section 218 that is fixed in place with respect to the filter cartridge assembly 34 by siphon tube alignment key 220, which is preferably gasketed. The siphon tube 210 is arranged to siphon water from the internal conduit 50 in the standpipe 200 and deliver it to the lower region 206. Weep holes 222 allow water to drain from the filter cartridge assembly 34, causing the siphon to subsequently break.

Figure 13:
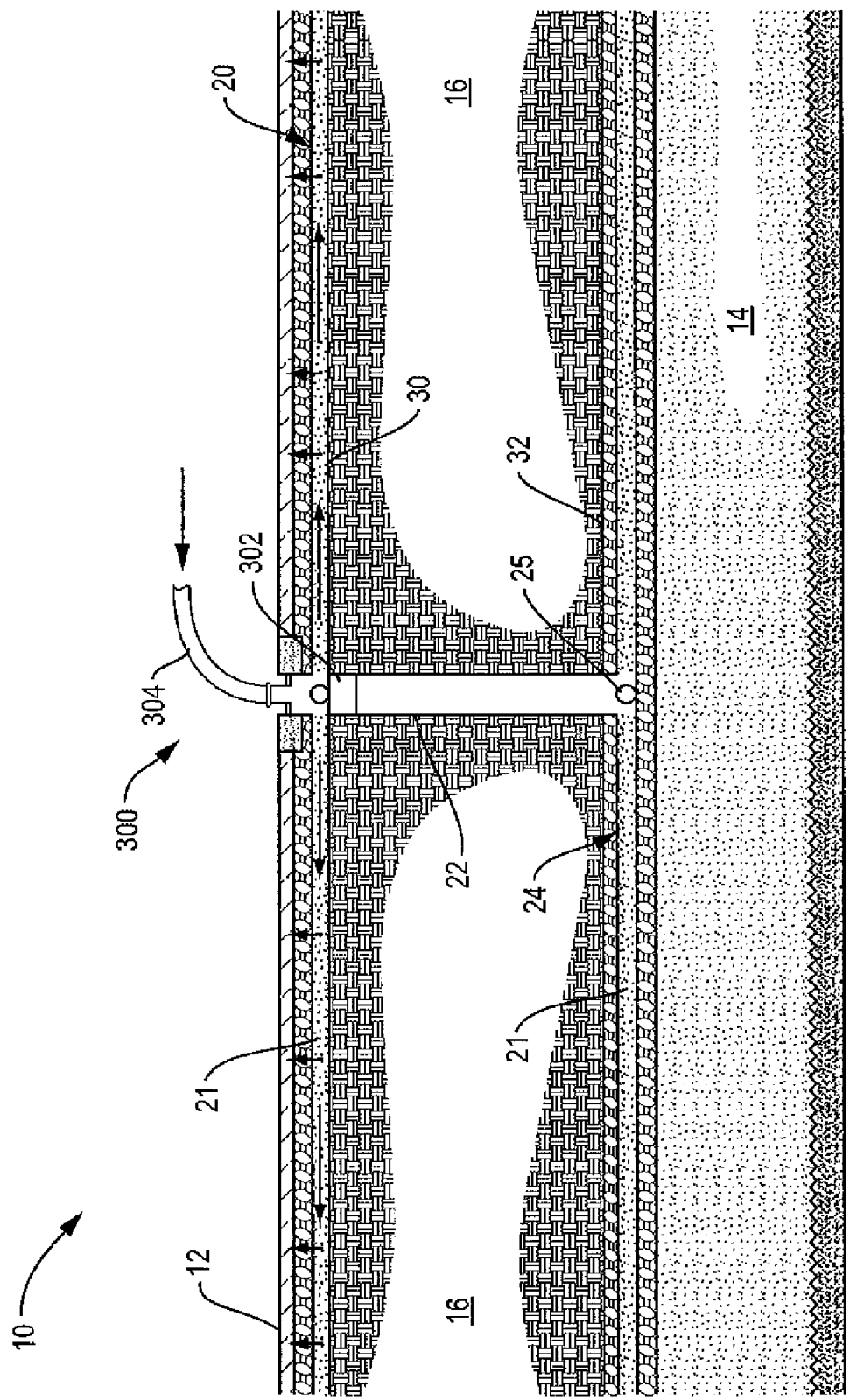
FIG. 13 is a section elevation view of the system of the present invention including a mechanism for back-flushing the system.

As illustrated in FIG. 13, the embodiment of the system 10 to be used with the pervious surface 12 may include a back-flush system 300 to be used to maintain the system 10 and, in particular, to flush out voids of the surface 12. The back-flush system 300 includes a standpipe plug 302 and a flush conduit 304, which may be coupled to a water source, for each standpipe of the first grid 20. The plug 302 is used for the purpose of preventing water flow from water source into the standpipes 22. The plug may be fabricated of any material and shape suitable for substantially sealing the standpipes 22 and resisting dislodgement when subjected to sufficient backflushing water pressure. When the water source is turned on, the water flows through the flush conduit 304 and is diverted into the receiving pipes of first grid 20. The water is then forces outwardly through the perforations 21 and moves through gravel, crushed rock, etc. between the first grid 20 and the surface 12 before contacting the surface 12 and dislodging matter trapped in the voids of the pervious surface 12. The back-flushing system 300 may also minimize blockage of the perforations 21 of the receiving pipes of the first grid 20 and thereby reduce maintenance obligations.

The present invention has been described with respect to specific embodiments and variations. Nevertheless, it is to be understood that various modifications may be made without departing from the spirit and scope of the invention. All equivalents are deemed to fall within the scope of this description of the invention as set out in the following claims.

What is claimed is:

1. A stormwater control system for controlling stormwater passing through an impervious surface to infiltration zone soil, wherein there is compacted fill material between the impervious surface and the infiltration zone soil, wherein a surface area size of the infiltration zone soil below the compacted fill is substantially equivalent to a surface area size of the impervious surface above the compacted fill, the control system comprising:
 a. one or more standpipes in fluid communication with the impervious surface for receiving stormwater runoff from the impervious surface, wherein the one or more standpipes extend through the compacted soil fill material; and
 b. means for transferring the stormwater from the one or more standpipes to the infiltration zone soil in a manner that disperses the stormwater substantially throughout the infiltration zone soil.

2. The control system as claimed in claim 1 wherein the means for conveying is a grid of stormwater delivery pipes positioned below the compacted fill material and above the infiltration zone soil and wherein the delivery pipes are in fluid communication with the one or more standpipes.

3. The control system as claimed in claim 2 wherein the delivery pipes are perforated pipes.

4. The control system as claimed in claim 3 further comprising a filter material positioned between the compacted fill material and the delivery pipes.

5. The control system as claimed in claim 1 further comprising a filter device removably positioned within one or more of the one or more standpipes.

6. The control system as claimed in claim 5 wherein the filter device includes a radial filter element.

7. The control system as claimed in claim 5 wherein the filter device substantially fills the interior of the standpipe.

8. The control system as claimed in claim 5 wherein the filter device is sealed against the internal walls of the standpipe.

9. The control system as claimed in claim 5 wherein the filter device includes an adjustable handle to adjust the positioning of the filter device within the standpipe.

10. The control system as claimed in claim 1 further comprising one or more hydraulic grade line control conduits in fluid communication with the one or more standpipes and positioned in the compacted fill material.

11. The control system as claimed in claim 1 further comprising for one or more of the one or more standpipes an overflow conduit in fluid communication with the standpipe.

12. A stormwater control system for controlling stormwater passing through an impervious surface to infiltration zone soil, wherein there is compacted fill material between the impervious surface and the infiltration zone soil, wherein a surface area size of the infiltration zone soil below the compacted fill is substantially equivalent to a surface area size of the impervious surface located above the compacted fill, the control system comprising:
 a. one or more catch basins in fluid communication with the impervious surface for receiving stormwater runoff from the impervious surface; and
 b. a grid of stormwater delivery pipes positioned below the compacted fill material and above the infiltration zone soil and wherein the delivery pipes are in fluid communication with the one or more catch basins for transferring the stormwater from the one or more catch basins to the infiltration zone soil in a manner that disperses the stormwater substantially throughout the infiltration zone soil.

13. The control system as claimed in claim 12 further comprising for one or more of the one or more catch basins a filter device removably positioned therein.

14. The control system as claimed in claim 13 wherein the filter device includes a radial filter element.

15. The control system as claimed in claim 12 further comprising for one or more of the one or more catch basins a basin overflow conduit in fluid communication with the catch basin.

16. The control system as claimed in claim 12 further comprising one or more hydraulic grade line control conduits in fluid communication with the one or more catch basins and positioned in the compacted fill material.

* * * * *